United States Patent
Klimek et al.

(10) Patent No.: US 7,317,741 B2
(45) Date of Patent: Jan. 8, 2008

(54) AMPLIFIED SPONTANEOUS EMISSION DUCTS

(75) Inventors: Daniel E. Klimek, Lexington, MA (US); Alexander E. Mandl, Brookline, MA (US)

(73) Assignee: Textron Systems Corporation, Wilmington, MA (US)

( * ) Notice: Subject to any disclaimer, the term of this patent is extended or adjusted under 35 U.S.C. 154(b) by 334 days.

(21) Appl. No.: 10/930,319

(22) Filed: Aug. 31, 2004

(65) Prior Publication Data

US 2006/0045152 A1   Mar. 2, 2006

(51) Int. Cl.
*H01S 3/00* (2006.01)
(52) U.S. Cl. .............. 372/33; 372/98; 372/69
(58) Field of Classification Search .......... 372/33, 372/98, 69
See application file for complete search history.

(56) References Cited

U.S. PATENT DOCUMENTS

| | | | |
|---|---|---|---|
| 5,307,430 A * | 4/1994 | Beach et al. | 385/31 |
| 5,436,759 A | 7/1995 | Dijaili et al. | 359/333 |
| 6,347,109 B1 | 2/2002 | Beach et al. | 372/75 |
| 6,587,488 B1 | 7/2003 | Meissner et al. | 372/29.01 |
| 2002/0105997 A1 * | 8/2002 | Zhang | 372/70 |
| 2002/0110164 A1 * | 8/2002 | Vetrovec | 372/36 |
| 2002/0114372 A1 | 8/2002 | Montagne | 372/75 |
| 2004/0114657 A1 | 6/2004 | Vetrovec | 372/70 |
| 2005/0152426 A1 * | 7/2005 | Dell'Acqua et al. | 372/69 |
| 2005/0254536 A1 * | 11/2005 | Hackel et al. | 372/39 |

FOREIGN PATENT DOCUMENTS

DE   27 25 675 A1   12/1977

OTHER PUBLICATIONS

Alexander Mandl, et al., "Flashlamp-Pumped Cr:LiSAF Thin-Slab Zigzag Laser", IEEE Journal of Quantum Electronics, vol. 34, No. 10, Oct. 1998, pp. 1992-1995.

* cited by examiner

*Primary Examiner*—Dung (Michael) T. Nguyen
(74) *Attorney, Agent, or Firm*—BainwoodHuang

(57) ABSTRACT

Amplified spontaneous emission (ASE) ducts are disclosed for use with various gain media. An ASE duct may be configured and arranged to remove ASE from solid state or liquid gain media and transmit the ASE to an exterior optical medium. The refractive index of an ASE duct is selected as desired based on the refractive index of a gain medium and an exterior optical medium. An ASE duct may include first and second boundary surfaces joined at a vertex having an included angle that allows ASE (light) reflected off on one boundary surface to be incident on the another boundary surface at less than the critical angle and transmitted outside of the ASE duct. Laser systems using ASE ducts and methods of using and manufacturing ASE ducts are disclosed.

34 Claims, 9 Drawing Sheets

AMPLIFIED SPONTANEOUS EMISSION DUCTS

This invention was made with government support under contract number F29601-D-0131 awarded by the Department of Defense through the U.S. Air Force. The U.S. Government has certain rights in this invention.

BACKGROUND

Lasers are widely used as sources of coherent light for many different applications. Compared to incoherent light, coherent laser light can have advantages such as higher intensity, fluence, and brightness levels for a given applied power. Applications where lasers are useful include, but are not limited to, telecommunications, welding, lithography, imaging, material destruction, and holography.

The action by which a laser produces an optical output, or laser action, is a rate process that relies on the excitation of electrons in an optically active medium to upper energy states or levels relative to thermal equilibrium. The addition of excitation energy to the electrons is often referred to as "pumping." Electrons that have been pumped from a thermal equilibrium state, or ground level, to a higher energy level may be referred to collectively as an "inverted population" or a "population inversion." In the absence of any triggering process, the excited electrons of an inverted population will spontaneously decay, making one or more transitions to lower energy levels.

An electron making a transition from a high to low energy level can emit a photon, in which case such a transition may be referred to as a "radiative" transition. An electron transition from a high to low energy level may involve heat or momentum transfer, without emitting light, in which case the transition may be referred to as "nonradiative" transition. Often both types of transitions, radiative and nonradiative, occur as an excited electron decays to a lower energy level. Media that undergo radiative transition when excited are sometimes referred to as optically "active" or "gain" media, in reference to the optical amplification that can be produced. Laser gain media, as light emitters, have at least one radiative transition available for electrons that have been pumped to sufficiently high energy levels. For optical pumping, i.e., electron excitation via photon absorption, spontaneous radiative transitions to lower energy levels are referred to as fluorescence, when certain conservation of momentum conditions are met.

Excited electrons undergoing radiative transitions spontaneously produce photons, and the resulting emission is referred to as "spontaneous" emission. When an incident photon causes an excited electron to undergo a radiative transition, the resulting emission of light is referred to as "stimulated" emission. The photons produced by stimulated emission have the same direction, wavelength, phase, and polarity, as the incident or triggering photon.

In an optically active medium, or gain medium, the fluorescence or spontaneous radiative decay of an excited electron produces a photon, which can in turn trigger or stimulate other excited electrons to undergo radiative transitions. For a given volume of gain medium, spontaneous emission or fluorescence is randomly produced and distributed over $4\pi$ steradians of solid angle, and can stimulate the emission of photons from other excited electrons in the gain medium, thereby amplifying the intensity of the spontaneously emitted photon. This phenomenon is sometimes referred to as amplified spontaneous emission (ASE). Because ASE is random and uniformly occurs over a solid angle of $4\pi$ steradians, ASE can deplete or reduce the inverted population that is available for stimulated emission in a desired resonance cavity mode and lead to degradation in performance of an associated laser.

A resonator or cavity is typically used in a laser to select a desired resonance mode, e.g., direction, wavelength, polarization, and phase, from ASE produced in the laser. Since ASE is a nonlinear loss mechanism, ASE that is not amplified by a resonator reduces the efficiency of the associated laser and is problematic with respect to scaling in laser size and pump rate.

SUMMARY

Embodiments of the present invention are directed to systems, apparatus, and methods that address the limitations described above. In particular, the present invention provides systems, apparatus, and methods for removing amplified spontaneous emission (ASE) from various optically active or gain media.

A first embodiment may include a laser system including a gain medium and at least one ASE duct. The at least one ASE duct is optically coupled to the gain medium. The at least one ASE duct is configured and arranged to remove ASE from the gain medium and transmit ASE to an exterior optical medium. The laser system may include pump means operable to excite the gain medium. One or more optical beams may be used for pump means. The at least one ASE duct may have a refractive index that is less than or equal to a refractive index of the gain medium. The at least one ASE duct may have a refractive index greater than an exterior optical medium, for example air. The gain medium may have a desired shape, such as a rectangular prism or a cylinder.

The at least one ASE duct may include a boundary surface defining a boundary between an optical material of the at least one ASE duct and the exterior optical medium. The at least one ASE duct may include an input surface adapted to a surface of the gain medium. The at least one ASE duct is configured and arranged to minimize the amount of ASE that is reflected from the boundary surface toward the gain medium. The boundary surface may include first and second boundary surfaces joined at a vertex having an included angle. The at least one ASE duct may be configured as a triangular prism or a pyramidal prism. The input surface of the ASE duct may be a desired shape such as rectangle or a cylinder. The laser system may include two or more ASE ducts, e.g., four ASE ducts. The pump means is operable to produce a pump wave traveling in a direction within the laser gain medium. The laser system may include a liquid disposed between the gain medium and the at least one ASE duct to remove heat. The liquid may be index-matched to the one or more ASE ducts.

The at least one ASE duct may include optical glass type BK-7 and the liquid may include carbon tretrachloride. The gain medium may be neodymium-doped yttrium aluminum garnet (Nd:YAG), neodymium-doped gadolinium gallium garnet (Nd:GGG), or ytterbium-doped yttrium aluminum garnet (Yb:YAG). The gain medium may be ytterbium-doped strontium fluorapatite (Yb:S-FAP). The gain medium may include a ceramic gain medium. The laser system may include an ASE absorber optically coupled to the gain medium. The laser system may include a heat sink thermally coupled to the ASE absorber. An optical connector may be positioned between the medium and the ASE absorber and may be transparent to ASE produced by the gain medium.

A second embodiment may include an ASE duct adapted for use with a gain medium. The ASE duct includes an input surface adapted to a surface of a gain medium. The ASE duct includes an optically inactive material having a refractive index greater than a refractive index of an exterior optical medium. The ASE duct includes a boundary surface configured and arranged to transmit ASE from the gain medium to the exterior optical medium. The exterior optical medium may be air. The optically inactive material may be type BK-7 optical glass. The boundary surface may include a first boundary surface and a second boundary surface joined at a vertex. The ASE duct may be configured in a desired shaped, for example a triangular prism, a pyramidal prism, or a cylinder. The ASE duct may be made of optical glass, which may be type BK-7.

A third embodiment may include a method for manufacturing a laser system having one or more ASE ducts. One or more ASE ducts may be formed from an optically inactive material that is transparent to a fluorescence wavelength of a gain medium. An input surface of each of the one or more ASE ducts may be adapted to a respective surface of the gain medium. The one or more ASE ducts may be optically coupled to the gain medium. The step of optically coupling the one or more ASE ducts with the gain medium may include placing the one or more ASE ducts into direct contact with the gain medium. The step of optically coupling the one or more ASE ducts with the gain medium may include coupling the one or more ASE ducts to the gain medium with a liquid. The liquid may be index matched to the one or more ASE ducts. The step of forming one or more ASE ducts may include forming first and second boundary surfaces. A desired included angle for a vertex may be selected based on a refractive index of the optically transparent and inactive material and a refractive index of the exterior medium. The first and second boundary surfaces may be joined and the input surface may be formed.

A fourth embodiment may include a method for reducing ASE performance degradation in a laser system. An optically inactive and transparent duct material may be placed into contact with a gain medium. First and second surfaces of the duct material may be configured to receive ASE from the gain medium. ASE may be removed from the gain medium and may be transmitted to an exterior optical medium. A second duct material may be placed into contact with the gain medium. An optically inactive and transparent duct material may be selected to have a refractive index greater than a refractive index of an exterior optical medium.

BRIEF DESCRIPTION OF THE DRAWINGS

These and other features, aspects, and advantages of the present invention will become better understood with regard to the following description, appended claims, and accompanying drawings. The drawings are not necessarily to scale, emphasis instead being placed on illustration of principles of the invention. The drawings include the following figures:

DETAILED DESCRIPTION

The present invention may be understood by the following detailed description, which should be read in conjunction with the attached drawings. The following detailed description of certain embodiments is by way of example only and is not meant to limit the scope of the present invention.

Embodiments of the present invention are directed to systems, apparatus, and methods that address the limitations described above for the prior art by quickly and efficiently removing amplified spontaneous emission (ASE) from optically active or gain media. By removing ASE from a given gain medium, a greater number of excited electrons may be available to produce photons in a desired resonance mode. Performance and efficiency of the gain medium and an associated laser may be accordingly improved. ASE may be removed from any type of solid state or liquid gain medium and the gain medium may have any suitable shape.

Figure 1:
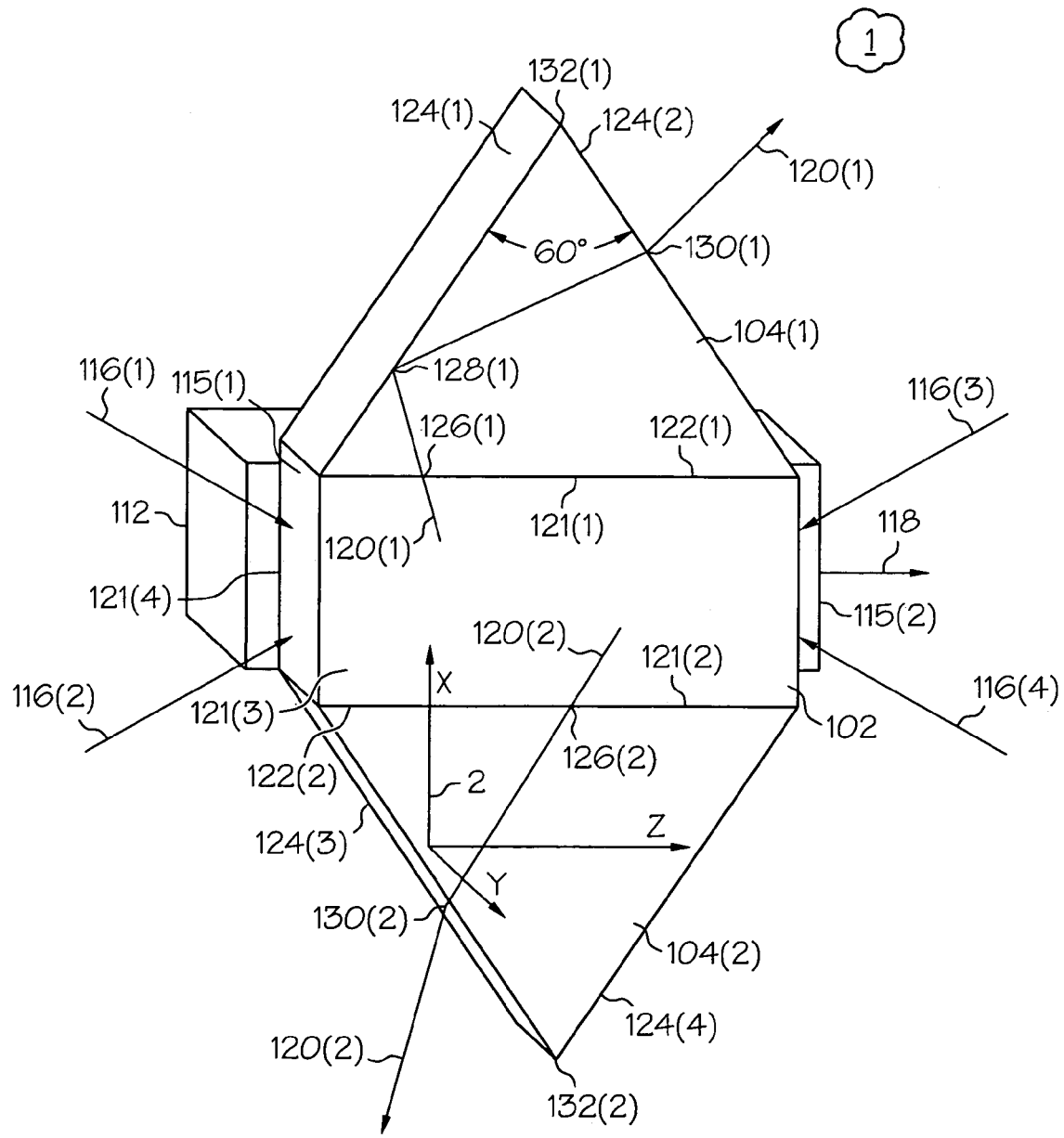
FIG. 1 is a perspective view of one embodiment of a gain medium with amplified spontaneous emission (ASE) ducts.

FIG. 1 is a perspective view of one embodiment 100 of the present invention, including an optically active medium, or gain medium 102 within an exterior optical medium 1. Reference coordinate axes 2 are shown for perspective. Two optical elements or ASE ducts 104(1), 104(2) are connected to the gain medium 102 to mitigate the effects of amplified spontaneous emission produced by the gain medium. The gain medium 102 may be shaped as a rectangular prism with end surfaces 115(1), 115(2) and lateral surfaces 121(1)-121(4) as shown. The ASE ducts 104(1), 104(2) are positioned with respective input surfaces 122(1), 122(2) in contact with first and second lateral surfaces 121(1), 121(2) of the gain medium 102. The gain medium 102 may be pumped by suitable means, such as optical beams 116(1)-116(4), and may produce an optical output 118. Opposing end surfaces 115(1), 115(2) may have coatings of a desired reflectivity coefficient to achieve certain characteristics, e.g., lasing threshold, of the optical output 118. The exterior optical medium 1 can be air, any other suitable gas, liquid or solid optical material, or a vacuum. An ASE absorber and heat sink assembly 112 may optionally be included to absorb ASE from the gain medium 102 and remove associated heat.

The ASE ducts 104(1), 104(2) are configured and arranged to quickly remove ASE from the laser gain medium 102. To facilitate the removal of ASE from the gain medium 102, the ASE ducts 104(1), 104(2) may have a refractive index that is higher in value than the refractive index of the exterior optical medium 1, e.g., air. For a given refractive index, $n_o$, of an exterior optical medium and given refractive index, $n_1$, of the gain medium 102, the ratio $n_o/n_1$ determines a range of angles, relative to the surface normal at the point of incidence or reflection, e.g., 128(1), above which there will be total internal reflection (TIR). This angle is often referred to as the critical angle, $\theta_c$. The ASE ducts 104(1), 104(2) may also have a shape such that a maximum amount of ASE in the ASE ducts 104(1)-104(2) is passed to the exterior optical medium 1 after a minimum number of reflections inside the ASE ducts 104(1), 104(2). The amount of ASE that reenters the gain medium 102 may accordingly be reduced and/or minimized. The ASE ducts 104(1), 104(2)

can consequently minimize ASE degradations in performance, such as the depletion of upper energy levels, for the gain medium 102 and any associated laser system.

As shown in FIG. 1, and described above, the ASE ducts 104(1), 104(2) are shaped to maximize the quick and efficient transmission of ASE from the gain medium 102 to the exterior optical medium 1. The ASE ducts 104(1), 104(2) include first and second boundary surfaces 124(1), 124(2) and 124(3), 124(4), respectively, that are arranged to receive ASE that has passed through the associated input surface 122(1), 122(2) and into the ASE ducts 104(1), 104(2) from the gain medium 102. Representative ASE photon paths or light rays 120(1), 120(2) indicate ASE passing from the gain medium 102 to the ASE ducts 104(1), 104(2) at transmission or interface points 126(1), 126(2), respectively. The first and second boundary surfaces 124(1), 124(2) and 124(3), 124(4) are joined at vertexes 132(1), 132(2), respectively. The vertexes 132(1), 132(2) may have a desired included angle, e.g., 60°.

ASE that is incident on a boundary surface, e.g., 124(1), within an ASE duct, e.g., 104(1), is either transmitted through or reflected from the surface, depending on the angle of incidence and the refractive index on either side of the boundary surface. By appropriate design of the vertex, e.g., vertex 132(1), for example by selection of the included angle, light such as ASE that is reflected from a boundary surface 124(1) is incident on a second boundary surface 124(2) at less than the critical angle. Because the ASE is incident on the second boundary surface 124(2) at less than the critical angle, the ASE is transmitted out of the ASE duct at a point of incidence 130(1), and into the exterior optical medium 1, as shown by representative light ray 120(1). In certain embodiments, ASE transmission to the exterior optical medium 1 after no or only one reflection may be facilitated by a vertex 132 (1) with an included angle greater than or substantially equal to the critical angle between the ASE material and the exterior optical medium.

As shown by representative light ray 120(2) in FIG. 1, ASE that is incident on a first boundary surface 124(3) of an ASE duct 104(2) at less than the critical angle is transmitted from the ASE duct 104(2) into the exterior optical medium 1 without undergoing total internal reflection. After being generated in the gain medium 102, light ray 120(2) passes through interface 126(2) into the ASE duct 104(2) and then through the first boundary surface 124(3) at point 130(2). Light incident on the boundary surfaces at less than the critical angle may have a reflected portion, due to a difference in refractive index between the material of the ASE duct and the exterior optical medium.

The ASE duct(s) 104(1), 104(2) may be made of any suitable material with a desired refractive index. In certain embodiments, a large critical angle may be desired to minimize ASE degradations in performance, in which case ASE ducts 104(1), 104(2) may have a refractive index that is matched to or slightly less than the refractive index of a given gain medium 102. In certain embodiment, the refractive index of the gain medium 102 may be equal to that of the ASE ducts 104(1), 104(2). A critical angle of $\pi/2$ radians, or 90° occurs when the refractive index of the gain medium is equal to the refractive index of an ASE duct, eliminating TIR within the gain medium.

In certain embodiments, total internal reflection may be desired within the gain medium 102, in which case the material of the ASE duct(s) may be selected accordingly. Based on the selection of gain medium and ASE duct materials, the critical angle for TIR at the boundary 121(1) between the gain medium 102 and the ASE duct(s) 104(1), 104(2) may be selected as desired. TIR may be useful in certain embodiments to reflect the laser beam in a zigzag fashion along the gain medium 102 and/or to distribute pump light 116(1)-116(4) within the gain medium 102.

Figure 2A:
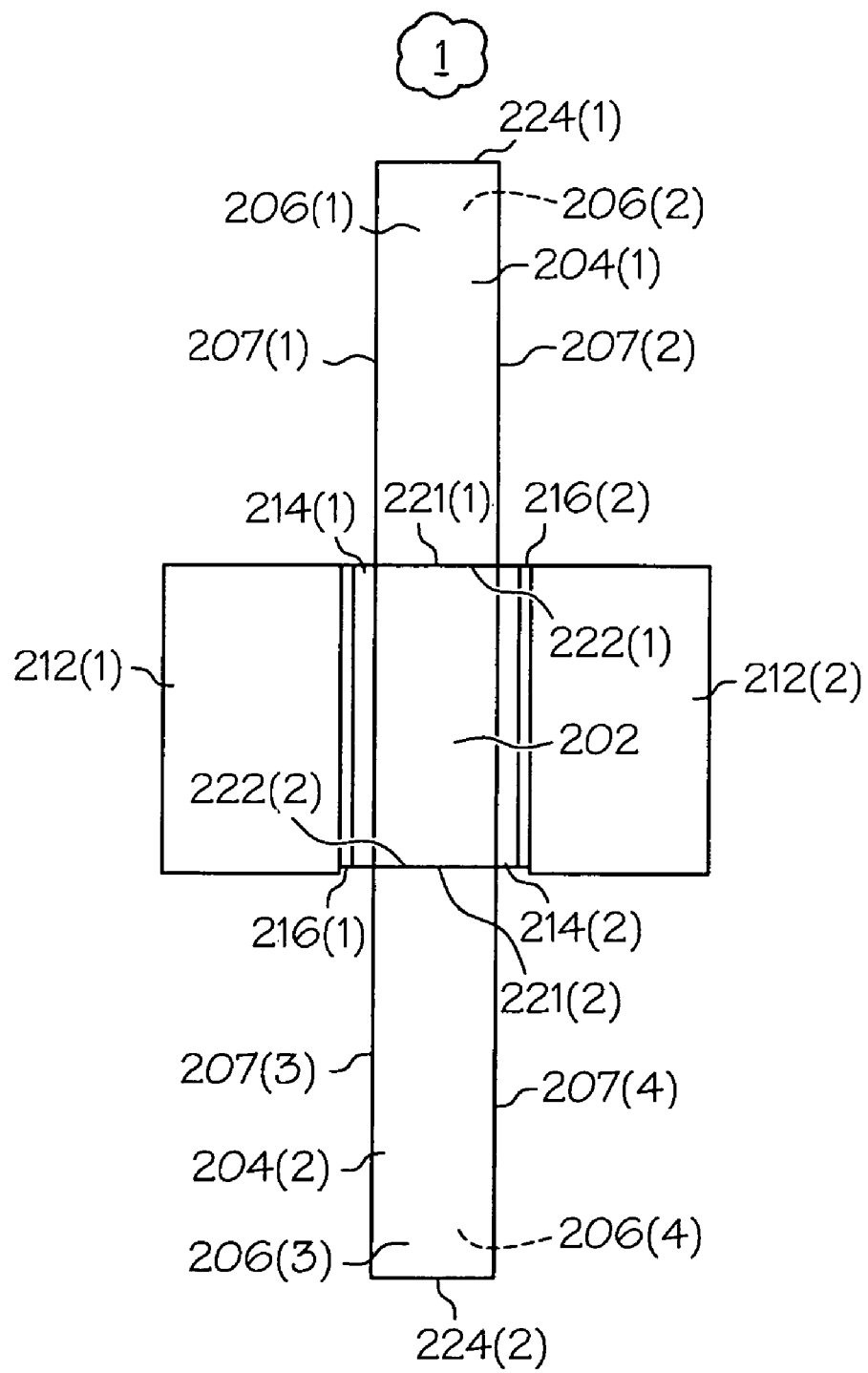
FIG. 2 includes FIG. 2A and FIG. 2B, which show cross sections of alternate embodiments of a laser system having two ASE ducts.
Figure 2B:
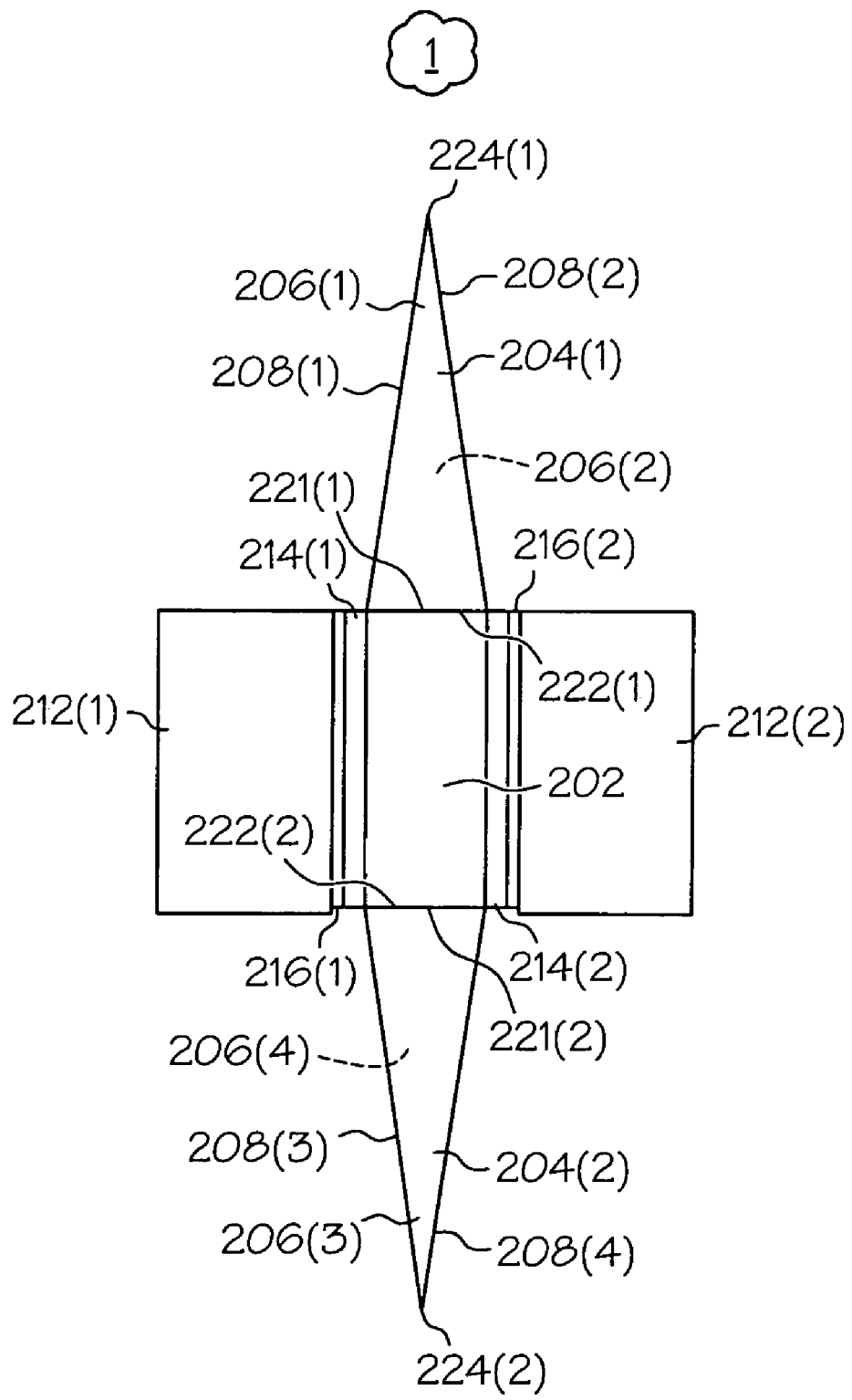

FIG. 2 includes FIG. 2A and FIG. 2B, which show cross sections of alternate embodiments 200 of a gain medium 202 and two ASE ducts 204(1), 204(2) surrounded by an external optical medium 1. As shown in FIG. 2A, the gain medium 202 may be shaped as a rectangular prism, as shown, or may have any other desired shape. The two ASE ducts 204(1), 204(2) are optically coupled at respective input surfaces 222(1), 222(2) to opposed first and second lateral surfaces 221(1), 221(2) of the gain medium 202. The ASE ducts 204(1), 204(2) have first and second boundary surfaces 206(1), 206(2) and 206(3), 206(4) and parallel sides 207(1)-207(2) and 207(3)-207(4) that define a boundary between the interior of the ASE ducts 204(1), 204(2) and the exterior optical medium 1. The respective boundary surfaces 206(1)-206(4) of each ASE duct 204(1), 204(2) meet at a vertexes 224(1)-224(2) that have a desired included angle. In FIG. 2A, the ASE ducts 204(1), 204(2) are shaped as triangular prisms with boundary surfaces 206(1)-206(4) and parallel sides 207(1)-207(4).

As shown in FIG. 2B, the ASE ducts 204(1), 204(2) may be shaped as pyramidal prisms. In FIG. 2B, each ASE duct, e.g., 204(1), has third and fourth boundary surfaces, e.g., 208(1) and 208(2), which take the places of sides 207(1) and 207(2) in FIG. 2A. For FIG. 2B, vertexes 224(1) and 224(2) have two included angles in orthogonal directions. The two included angles of each vertex 224(1), 224(2) may be different from one another and may be adapted to the shape or surface of the associated gain medium 202.

Two ASE absorbers 216(1), 216(2) may be present as shown to facilitate the absorption of ASE produced by the gain medium 202. The ASE absorbers 216(1), 216(2) may be optically connected to the gain medium by optical waveguides or optical connectors 214(1), 214(2). The optical connectors 214(1), 214(2) may be made of a suitably transparent material. In certain embodiments, it may be desirable to have the pump energy be contained within the gain medium 202. The refractive index of the optical connectors 214(1), 214(2) may accordingly be selected to give desired TIR angles. Heat sinks 212(1), 212(2) may be thermally connected to and dissipate heat from the ASE absorbers 216(1), 216(2). Any suitable heat sink or thermal management system may be used in conjunction with the ASE absorbers 216(1), 216(2).

Figure 3:
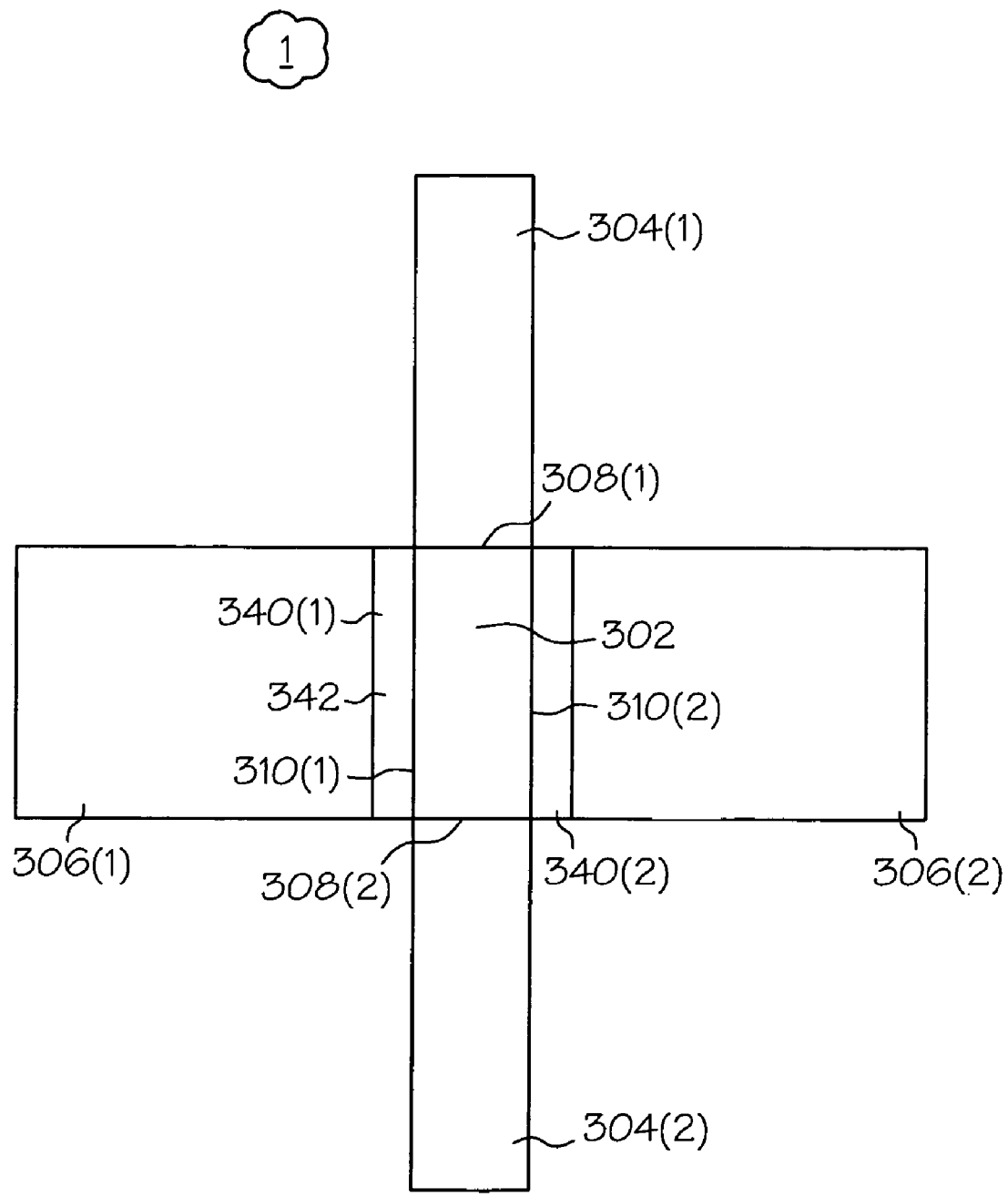
FIG. 3 is a cross section of an embodiment having a gain medium and four ASE ducts.

Certain embodiments may include more than two ASE ducts for a given gain medium. FIG. 3 is a cross section of an alternate embodiment 300 having a gain medium 302 and four ASE ducts 304(1), 304(2) and 306(1), 306(2). The gain medium 302 and ASE ducts 304(1), 304(2) and 306(1), 306(2) are surrounded by an exterior optical medium 1, such as air. The gain medium 302 has a rectangular cross section, with two pairs of opposing sides 308(1), 308(2) and 310(1), 310(2). The two pairs of opposing sides 308(1), 308(2) and 310(1), 310(2) may have different lengths or may have the same length as desired.

As shown in FIG. 3, the configuration and size of ASE ducts 304(1), 304(2) and 306(1), 306(2) may be adapted to the configuration of surfaces of the associated gain medium 302. Each of the ASE ducts may have a different size and configuration than the other ASE duct(s). By having ASE ducts 304(1), 304(2) and 306(1), 306(2) of different sizes and configurations, ASE removal may be maximized for a gain medium 302 having a given shape, e.g., a rectangular prism.

In certain embodiments, the gain medium 302 may be optically coupled to one or more ASE ducts 306(1), 306(2) by a liquid 342 to facilitate the removal of heat from the gain medium 302. The liquid 342 may circulate within passages 340(1), 340(2) along one or more surfaces 310(1), 310(2) of the gain medium 302. The refractive index of the liquid 342 may be matched to the associated ASE duct(s) 310(1), 310(2) to facilitate removal of ASE from the gain medium 302. For example, carbon tetrachloride (CCl$_4$), which has a refractive index of 1.46, may be used for heat removal with ASE ducts made of optical glass, which typically has a refractive index near 1.5. Such index-matching between the liquid 342 and the ASE ducts 306(1), 306(2) may allow the liquid to have the same or similar ASE removal or extraction properties as the ASE ducts 306(1), 306(2).

Figure 4:
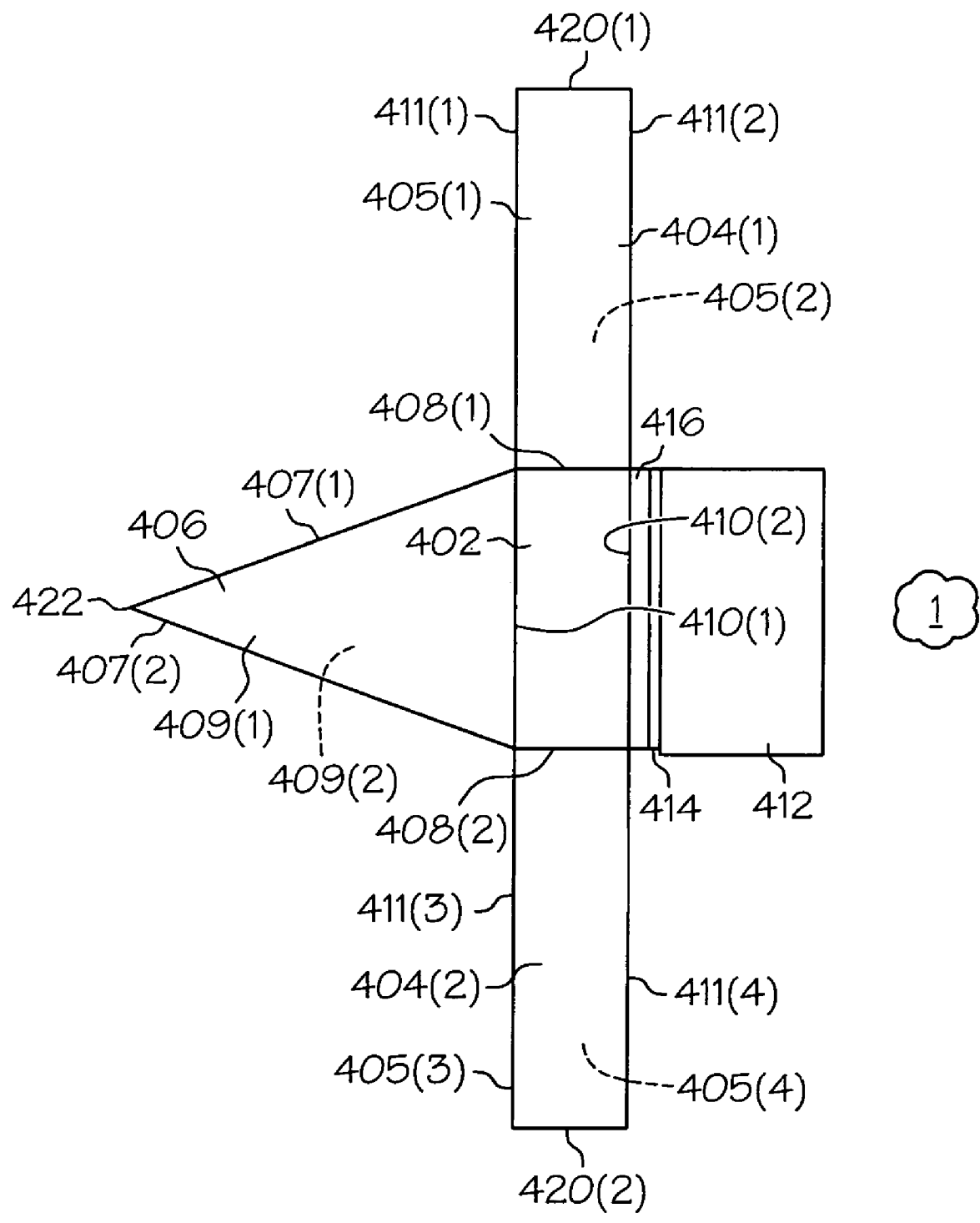
FIG. 4 is a cross section of an embodiment having a gain medium and three ASE ducts.

FIG. 4 is a cross section of an embodiment 400 of a laser system including a gain medium 402 and three ASE ducts, 404(1), 404(2), and 406, that are surrounded by an exterior optical medium 1. The gain medium 402 may be shaped as a rectangular prism with pairs of opposing lateral surfaces 408(1), 408(2) and 410(1), 410(2). The three ASE ducts are configured as a pair of similar ASE ducts 404(1), 404(2) and a third ASE duct 406 having a different configuration. The pair of similarly configured ASE ducts 404(1) and 404(2) each have first and second boundary surfaces 405(1), 405(2) and 405(3), 405(4) that are joined at vertexes 420(1) and 420(2), respectively. The ASE ducts 404(1), 404(2) are coupled to opposing lateral surfaces 408(1), 408(2) of the gain medium 402. The vertexes 420(1), 420(2) have an included angle (orthogonal to the plane of FIG. 4) that may have a desired magnitude. ASE ducts 404(1) and 404(2) have parallel sides 411(1), 411(2) and 411(3), 411(4), respectively. ASE duct 406 is connected to lateral surface 410(1) of the gain medium 402. ASE duct 406 may have first and second boundary surfaces 407(1), 407(2) that are joined at a vertex 422 that has a different included angle than, e.g., one that is orthogonal to, the included angles of the other vertexes 420(1), 420(2). In certain embodiments, a vertex of an ASE duct may have more than one included angle. For example, ASE duct 406 may be shaped as a pyramidal prism and vertex 422 may include a second included angle between third and fourth boundary surfaces 409(1), 409(2).

With continued reference to FIG. 4, an optional ASE absorber 414 may be present. The ASE absorber 414 may facilitate absorption of ASE produced by the gain medium 402. The ASE absorber 414 may be optically connected to the gain medium at a surface, e.g., lateral surface 410(2), by an optical connector 416. The optical connector 416 can be used to minimize thermal gradients and refractive index changes in the gain medium 402 by removing heat generated in the ASE absorber to a location at a desired distance from the gain medium 402. A heat sink 412 may be thermally connected to the ASE absorber 414 to remove or dissipate heat.

Figure 5:
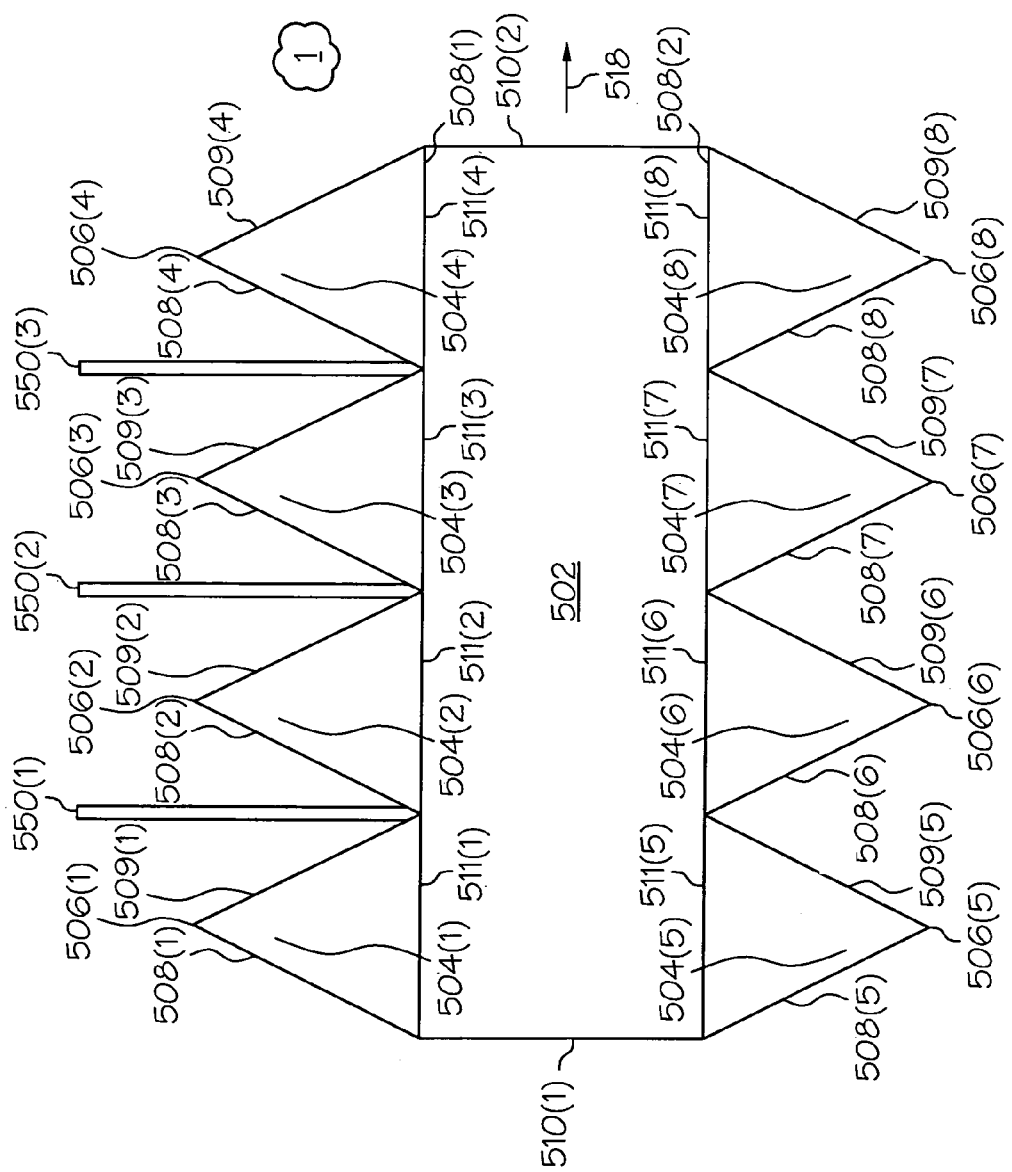
FIG. 5 is a cross section of an alternate embodiment having multiple ASE ducts along two surfaces of a gain medium.

In certain embodiments, multiple ASE ducts may be coupled to a particular portion or surface of a given gain medium. FIG. 5 is a cross section of an alternate embodiment 500 having multiple ASE ducts 504(1)-504(8) along two surfaces of a gain medium 502 within an exterior optical medium 1. The gain medium 502 has first and second end surfaces 510(1), 510(2) to form a resonator and output 518. The gain medium has two lateral surfaces 508(1), 508(2) coupled to the ASE ducts 504(1)-504(8). The ASE ducts 504(1)-504(8) have respective first and second boundary surfaces 508(1)-508(8) and 509(1)-509(8) that are joined at vertexes 506(1)-(8), respectively. The ASE ducts 504(1)-(8) include respective input surfaces 511(1)-511(8) that are arranged to receive light from the gain medium 502. To facilitate the removal of ASE from the gain medium 502, each lateral surface, e.g., 508(1), of the gain medium is optically coupled to four ASE ducts, e.g., 504(1)-504(4). Optional absorption blocks 550(1)-(3) may be present between the ASE ducts 504(1)-(8) as shown to prevent light that has been emitted from one ASE duct, e.g., 504(1), from entering an adjacent ASE duct, e.g., 504(1) and reentering the gain medium 502. The absorption blocks 550(1)-(3) may include or may be coated with material that absorbs photons of a desired wavelength, e.g., the ASE wavelength(s).

As shown in FIG. 5, by having multiple ASE ducts along a portion or surface, e.g., lateral surface 508(1), of a particular gain medium, the dimensions of the individual ASE ducts 504(1)-504(8) may be kept to a minimum or desired size, e.g., for manufacturability concerns, while still providing beneficial ASE extraction from the gain medium 502. Multiple ASE ducts may accordingly be desirable to provide ASE reduction for a gain medium of given dimensions without requiring ASE ducts that are difficult or over costly to manufacture.

Figure 6B:
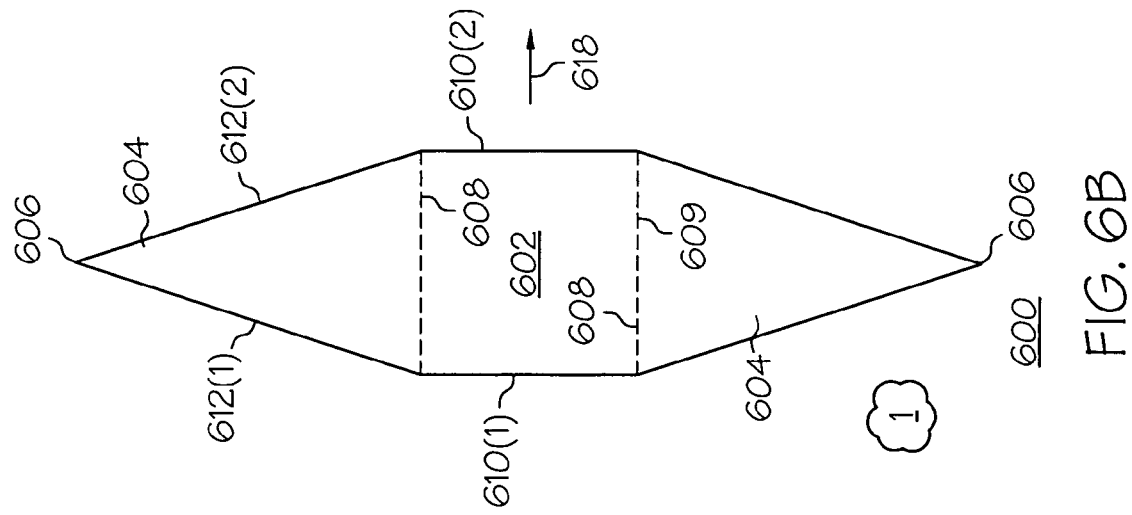
FIG. 6 includes FIG. 6A and FIG. 6B, which show cross sections of an ASE duct configured for a cylindrical gain medium.
Figure 6A:
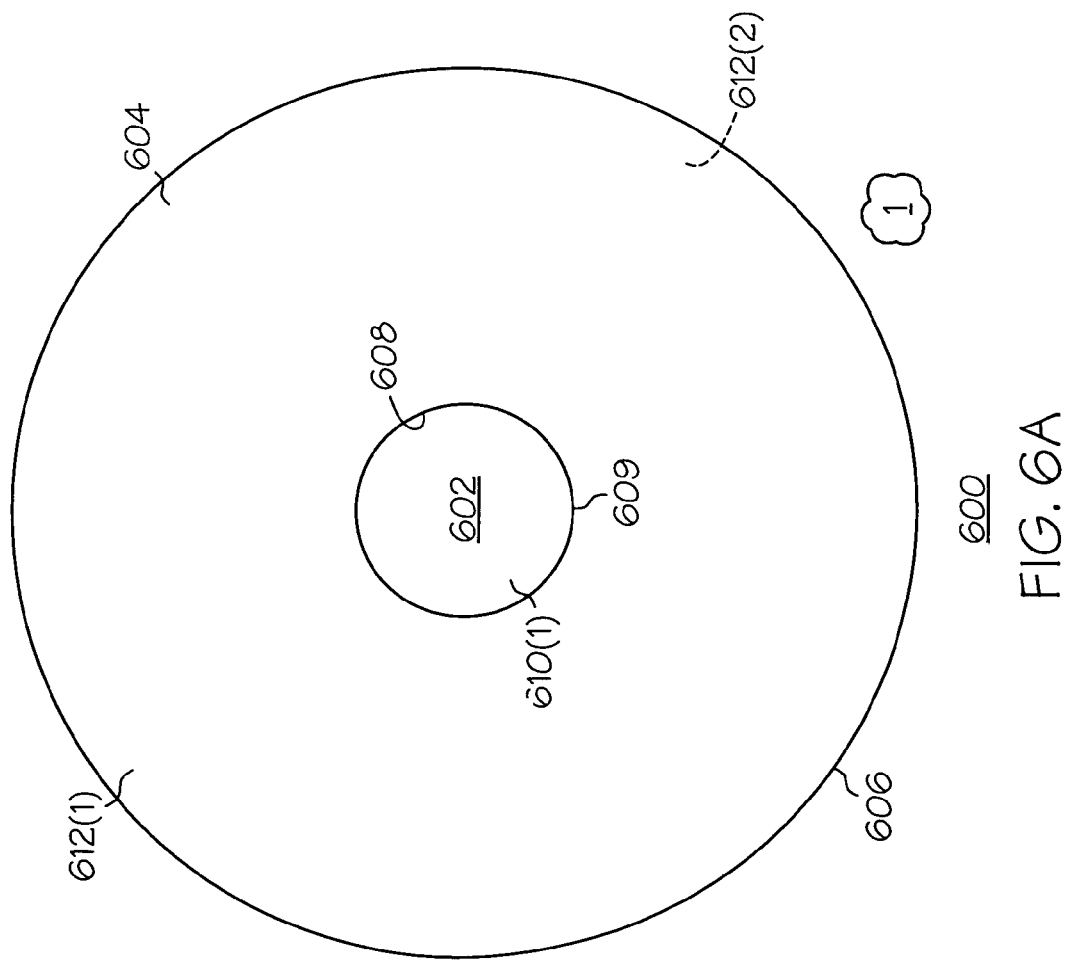

While gain media for the previous embodiments have generally been described as being shaped as rectangular prisms, ASE ducts are not limited to use with any particular shape of gain media. FIG. 6 includes FIG. 6A and FIG. 6B, which show orthogonal cross sections of an embodiment 600 including a cylindrical gain medium 602 and ASE duct 604 surrounded by an external optical medium 1. FIG. 6A shows a front view of the ASE duct 604 while FIG. 6B shows a side view of the embodiment 600 of FIG. 6A.

The gain medium 602 has a cylindrical shape with a lateral surface 608 and end surfaces 610(1), 610(2). The end surfaces 610(1), 610(2) may have suitable reflectivity coefficients and support production of a laser output 618 as shown. The ASE duct 604 has an input surface 609 that is shaped to receive, and therefore optically couple to, the lateral surface 608 of the gain medium 602. The ASE duct 604 includes first and second boundary surfaces 612(1), 612(2) that extend to the input surface and are joined at a vertex 606. The vertex 606 has an included angle that may be selected as desired to facilitate maximum extraction of ASE from the gain medium 602 and into the outer optical medium 1.

Figure 7:
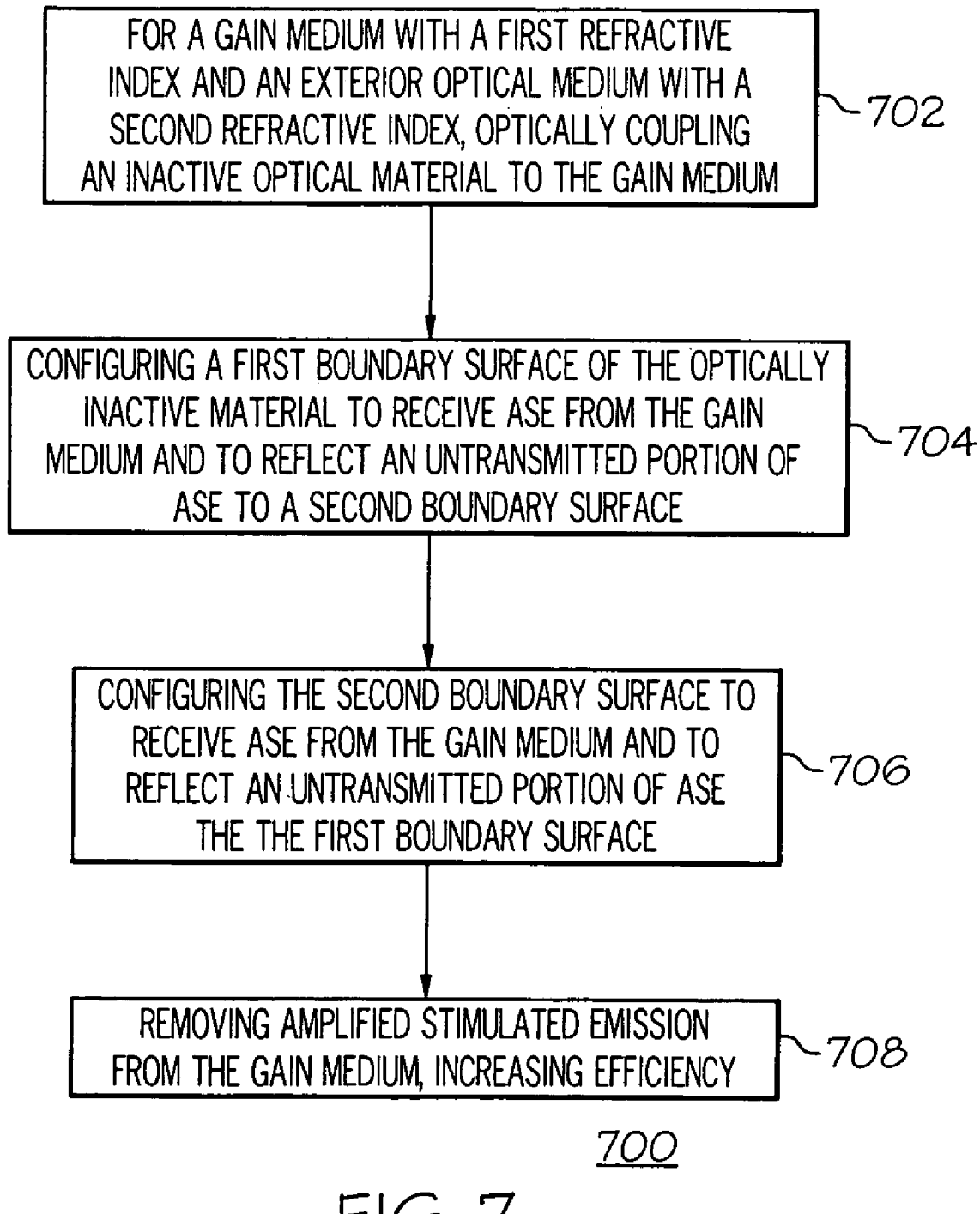
FIG. 7 shows steps in a method for reducing ASE performance degradation in a laser system.

FIG. 7 shows steps in one embodiment 700 of a method for reducing ASE performance degradation in a laser system. For a particular gain medium with a first refractive index and shape and an exterior optical medium with a second refractive index, an optically inactive and transparent material with a third refractive index may be placed 702 into contact with the gain medium. A first boundary surface between the optically inactive material and an exterior optical medium may be configured 704 with respect to a first surface of the optically inactive material and a first surface of the gain medium to receive ASE from the gain medium. A second boundary surface between the optically inactive material and an exterior optical medium may be positioned 706 with respect to the first boundary surface and the first surface of the optically inactive material such that ASE that is reflected from the first boundary surface is transmitted through the second boundary surface to the exterior optical medium.

Continuing with the description of method 700, ASE can be removed 708 from the gain medium by the optically inactive material and transmitted to the exterior optical medium, increasing the efficiency of the laser. The step of removing 708 ASE may include pumping the gain medium. An input surface of the optically inactive and transparent material may be adapted to the first surface of the gain medium. The steps of configuring the first and second boundary surfaces may be included in a step of forming a vertex with a desired included angle. The desired included angle may be derived from or based on the critical angle between the optically inactive and transparent material and the exterior optical medium.

Figure 8:
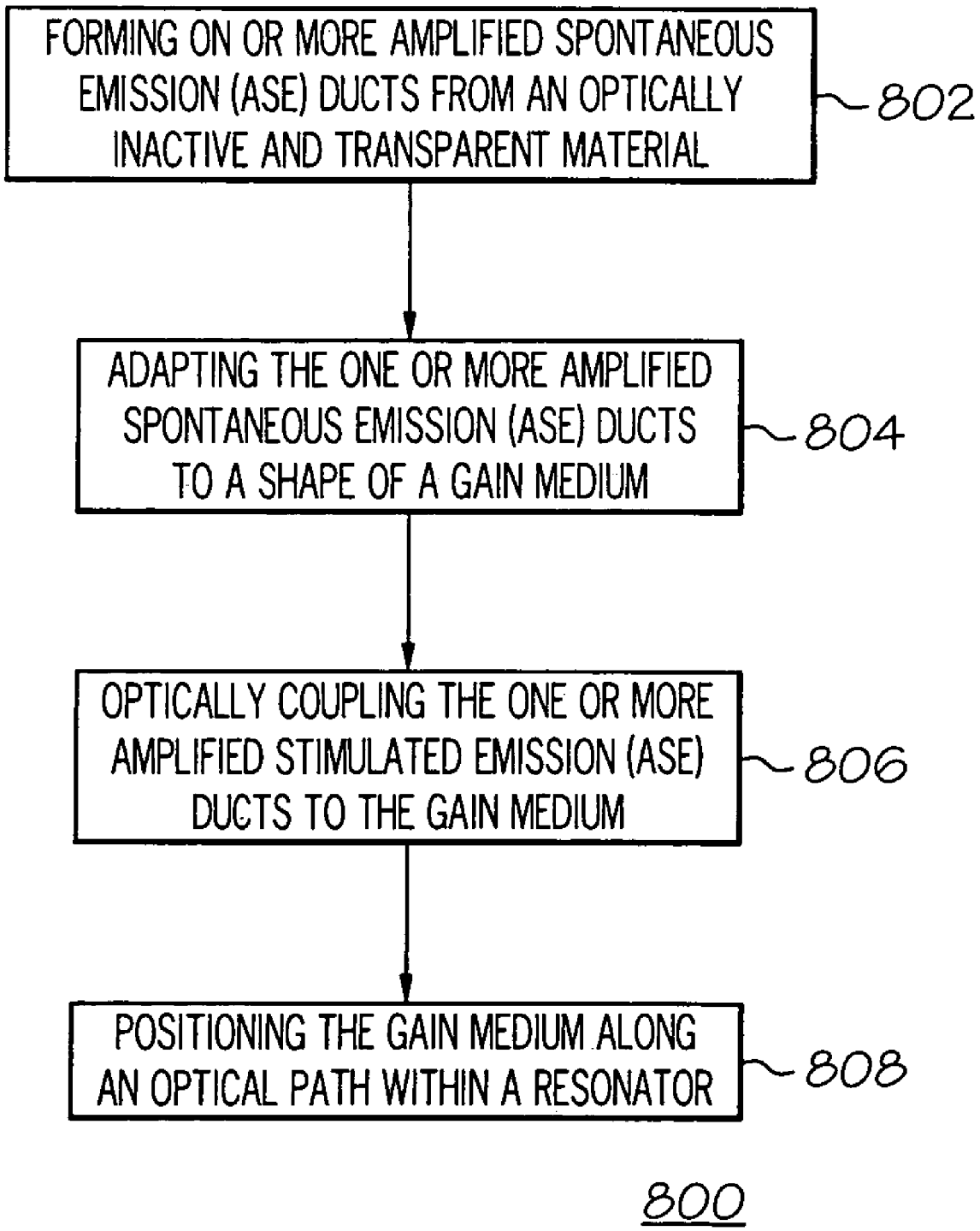
FIG. 8 shows steps in a method for manufacturing a laser system having ASE ducts.

FIG. 8 shows steps in an embodiment 800 of a method for manufacturing a laser system having ASE ducts. One or more amplified stimulated emission ducts may be formed 802 from an optically inactive material that is transparent to a fluorescence wavelength of a gain medium. The one or more ASE ducts may be adapted 804 to the shape of the gain medium to provide optical coupling. The ASE ducts may be optically coupled 806 to the gain medium. The step of forming 802 one or more ASE ducts may include shaping the one or more ASE ducts to maximize extraction of ASE from a given gain medium to an external optical medium. For example, the step of forming one or more ASE ducts may include forming a vertex with a desired included angle between first and second boundary surfaces. The gain medium may be placed along an optical path within a resonator. Suitable pumps means may be configured and arranged to pump the gain medium. The step of forming 802 the one or more ASE ducts may include forming a vertex with an included angle based on the critical angle between the ASE duct material and the exterior optical medium.

In certain embodiments, the step of optically coupling the one or more ASE ducts to the gain medium may include placing the ASE ducts into direct contact with the gain medium. In certain embodiments, the step of optically coupling the one or more ASE ducts to the gain medium may include fluidic coupling to the gain medium by a liquid having a suitable refractive index. Such a liquid may be index-matched to the ASE ducts and may be beneficial to remove heat from the gain medium.

With reference to FIG. 1, operation and use of one embodiment of the present invention will now be described. A gain medium 102 that is shaped as a rectangular prism is optically coupled to two ASE ducts 104(1), 104(2), which are each shaped as a triangular prism. The gain medium 102 is optically pumped, for example by end pumping with four pump beams 116(1)-116(4) as shown in FIG. 1. The energy of the pump beams excites the optically active material of the gain medium 102, causing a population inversion. As electrons in the inverted population decay, initial fluorescence causes ASE, which goes into $4\pi$ steradians of solid angle within the gain medium 102.

A portion of ASE produced in the gain medium 102 is incident on the boundaries 122(1), 122(2) between the gain medium 102 and an ASE duct 104(1) at an angle of incidence less than the critical angle of the gain medium and ASE duct materials and enters into the ASE duct. ASE that encounters the boundary between the gain medium and the ASE duct at an angle of incidence greater than the critical angle or that is parallel to the boundary stay within the gain medium 102 and is available to be amplified by an associated resonator cavity, for example, mirrored surfaces 115(1), 115(2).

Between the gain medium 102 and any exterior optical medium 1, to the extent there is a refractive index mismatch at the boundary, e.g., lateral surface 121(1), ASE produced in the gain medium 102 will be reflected back into the gain medium 102. For a given refractive index, $n_o$, of an exterior optical medium and given refractive index, $n_1$, of the gain medium 102, the ratio $n_o/n_1$ determines a range of angles, relative to the surface normal at the point of incidence or reflection, e.g., 128(1), above which there will be total internal reflection. This angle is often referred to as the critical angle, $\theta_c$. By having a refractive index between that of the exterior optical medium 1 and the gain medium 102, the ASE ducts 104(1), 104(2) increase the critical angle for the gain medium 102, allowing a greater amount of the ASE to leave the gain medium 102 than would be the case in the absence of the ASE ducts 104(1), 104(2).

With continued reference to FIG. 1, examples of ASE extraction for certain gain medium and ASE duct materials will now be described. In certain embodiments, the gain medium 102 may be made of ytterbium-doped strontium fluorapatite (Yb:S-FAP), with a refractive index of 1.63. ASE ducts 104(1), 104(2) may be made from optical glass type BK-7, with a refractive index of 1.51. For these materials, the critical angle for light leaving the gain medium 102 through an interface or boundary between with the ASE ducts 104(1)-104(2) is the inverse sine of the ratio of the refractive index of the optical glass divided by the refractive index of the Yb:S-FAP. Consequently, the critical angle at the interface between the Yb:S-FAP and BK-7 is 67.8 degrees.

Continuing with the example, ASE that is incident on an ASE duct/gain medium boundary at an angle less that the critical angle, i.e., 67.8 degrees, is transmitted into the ASE ducts 104(1), 104(2). Any ASE that is incident on the boundary at an angle greater than the critical angle of 67.8 degrees will be retained within the gain medium by TIR and may deplete the inverted population. If the ASE duct was not present, and air (with a refractive index, n=1) was the optical medium immediately exterior to the gain medium 102, then only ASE that was incident on a boundary, e.g., lateral face 121(1), at angles less than the critical angle of 37.8 degrees would pass out of the gain medium 102. The smaller critical angle or 37.8 degrees represents a smaller solid angle by a factor of 3.2 for any give planar output surface or emitting area of the gain medium 102.

Once this increased amount of ASE enters the ASE ducts 104(1), 104(2) from the gain medium 102, the configuration of the ASE duct boundary surfaces 124(1)-124(4) allows ASE to be quickly and efficiently transmitted to the exterior optical medium 1. As shown by representative light rays 120(1), 120(2), ASE may be transferred to the exterior optical medium 1 without TIR reflection back into the gain medium 102.

Embodiments of the present invention accordingly have a number of advantages and may be useful in laser applications where there is a need for high efficiency and/or low noise output. By having a refractive index higher than that of an exterior optical medium, ASE ducts may be used to increase the extraction or removal of ASE from various gain media. An ASE duct may be shaped to optimally transfer ASE from an associated gain medium to an exterior optical medium.

An ASE duct may be shaped such that ASE incident on a first boundary surface between the ASE duct and the exterior optical medium is either transmitted through the first boundary surface or reflected to a second boundary surface where the ASE is transmitted to the exterior optical medium. By removing ASE from a gain medium, more of the inverted population may be available for stimulated emission, increasing the efficiency of an associated laser. Removal of ASE from a gain medium may also increase output beam quality, e.g., by reducing noise. The optical coupling of one or more ASE ducts having a higher refractive index than the exterior optical medium 1 allows a greater amount of ASE to be removed from the gain medium, e.g., gain medium 102, than would be possible if the ASE ducts were not present.

Although certain embodiments of the present invention have been described, other versions are possible. For example, while embodiments have been described as having certain gain media, the present invention is not limited to use with any particular gain medium. For example, ASE ducts may be used to mitigate the effects of ASE for any solid state gain media. Example of such solid state gain media include, but are not limited to, crystal or sintered ceramic laser gain media materials, such as neodymium-doped yttrium aluminum garnet (Nd:YAG), with neodymium-doped gadolinium gallium garnet (Nd:GGG), or ytterbium-doped yttrium aluminum garnet (Yb:YAG). Moreover, while solid state gain media have been described, ASE ducts may be used to remove ASE from liquid gain media as well. For example, ASE ducts may be used to remove ASE from liquid dye gain media.

While optical means or pumping gain media have been described, are shown, laser gain media may be excited or pumped by any suitable means, including but not limited to thermal, optical, electrical, and chemical means. Furthermore, use of ASE ducts has been described with gain medium of particular shapes, gain media having any number of sides, including those with curved surfaces may be used within the scope of the present invention. An ASE duct also may include or be used with intermediary waveguides between the first and second boundary surfaces and the related gain medium.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise.

What is claimed is:

1. A laser system comprising:
    a gain medium; and
    at least one amplified spontaneous emission (ASE) duct optically coupled to said gain medium, wherein said at least one ASE duct is configured and arranged to remove ASE from said gain medium;
    wherein said at least one ASE duct comprises a boundary surface defining a boundary between an optical material of said at least one ASE duct and said exterior optical medium;
    wherein said boundary surface comprises first and second boundary surfaces joined at a vertex having an included angle.

2. The laser system of claim 1, further comprising pump means operable to excite said gain medium.

3. The laser system of claim 1, wherein said at least one ASE duct has a refractive index that is less than a refractive index of said gain medium.

4. The laser system of claim 1, wherein said at least one ASE duct has a refractive index that is equal to a refractive index of said gain medium.

5. The laser system of claim 1, wherein said at least one ASE duct has a refractive index greater than a refractive index of an exterior optical medium.

6. The laser system of claim 5, wherein said exterior optical medium is air.

7. The laser system of claim 1, wherein said at least one ASE duct further comprises an input surface adapted to a surface of said gain medium.

8. The laser system of claim 1, wherein said at least one ASE duct is configured and arranged to minimize the amount of ASE that is reflected from said boundary surface toward said gain medium.

9. The laser system of claim 1, wherein said at least one ASE duct is configured as a triangular prism.

10. The laser system of claim 1, wherein said at least one ASE duct is configured as a pyramidal prism.

11. The laser system of claim 7, wherein said input surface is a rectangle.

12. The laser system of claim 7, wherein said input surface is a cylinder.

13. The laser system of claim 1, wherein said at least one ASE duct comprises two or more ASE ducts.

14. The laser system of claim 13, further comprising one or more absorption blocks disposed between respective adjacent pairs of said two or more ASE ducts.

15. The laser system of claim 2, wherein said pump means is operable to produce a pump wave traveling in a direction within said laser gain medium.

16. The laser system of claim 1, wherein said gain medium is shaped as a rectangular prism.

17. The laser system of claim 1, wherein said gain medium is shaped as a cylinder.

18. The laser system of claim 1, further comprising a liquid disposed between said gain medium and said at least one ASE duct to remove heat.

19. The laser system of claim 18, wherein said liquid is index-matched to said at least one ASE duct.

20. The laser system of claim 19, wherein said liquid comprises carbon tretrachloride and said at least one ASE duct comprises optical glass type BK-7.

21. The laser system of claim 1, wherein said gain medium is neodymium-doped yttrium aluminum garnet (Nd:YAG), neodymium-doped gadolinium gallium garnet (Nd:GGG), or ytterbium-doped yttrium aluminum garnet (Yb:YAG).

22. The laser system of claim 1, wherein said gain medium comprises ytterbium-doped strontium fluorapatite (Yb:S-FAP).

23. The laser system of claim 1, wherein said gain medium comprises a ceramic gain medium.

24. The laser system of claim 1, further comprising an ASE absorber optically coupled to said gain medium.

25. The laser system of claim 24, further comprising a heat sink thermally coupled to said ASE absorber.

26. The laser system of claim 25, further comprising an optical connector disposed between said gain medium and said ASE absorber, wherein said optical connector is transparent to ASE produced by said gain medium.

27. The laser system of claim 1, wherein said at least one ASE duct comprises optical glass type BK-7.

28. An amplified spontaneous emission (ASE) duct adapted for use with a gain medium, said ASE duct comprising:
    an input surface adapted to a surface of said gain medium;
    an optically inactive material having a refractive index greater than a refractive index of an exterior optical medium; and
    a boundary surface configured and arranged to transmit ASE from said gain medium to said exterior optical medium;

wherein said boundary surface comprises a first boundary surface and a second boundary surface joined at a vertex.

29. The ASE duct of claim 28, wherein said exterior optical medium is air.

30. The ASE duct of claim 28, wherein said optically inactive material is type BK-7 optical glass.

31. The ASE duct of claim 28, wherein said ASE duct is configured as a triangular prism.

32. The ASE duct of claim 28, wherein said ASE duct is configured as a pyramidal prism.

33. The ASE duct of claim 28, wherein said input surface is cylindrical.

34. The laser system of claim 1, wherein the ASE duct is formed of a material having a refractive index that is substantially equal to a refractive index of the gain medium.

* * * * *